(12) United States Patent
Salman et al.

(10) Patent No.: US 10,846,581 B2
(45) Date of Patent: Nov. 24, 2020

(54) RADIO FREQUENCY ENERGY HARVESTING APPARATUS AND METHOD FOR UTILIZING THE SAME

(71) Applicant: The Research Foundation for The State University of New York, Albany, NY (US)

(72) Inventors: Emre Salman, St. James, NY (US); Milutin Stanacevic, Smithtown, NY (US); Tutu Wan, Stony Brook, NY (US); Yasha Karimi, Selden, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 208 days.

(21) Appl. No.: 16/096,431

(22) PCT Filed: May 4, 2017

(86) PCT No.: PCT/US2017/031058
§ 371 (c)(1),
(2) Date: Oct. 25, 2018

(87) PCT Pub. No.: WO2017/192849
PCT Pub. Date: Nov. 9, 2017

(65) Prior Publication Data
US 2020/0285925 A1 Sep. 10, 2020

Related U.S. Application Data

(60) Provisional application No. 62/331,601, filed on May 4, 2016.

(51) Int. Cl.
*G06K 19/07* (2006.01)
*H02J 7/02* (2016.01)
*H02J 50/00* (2016.01)

(52) U.S. Cl.
CPC ..... *G06K 19/0708* (2013.01); *G06K 19/0723* (2013.01); *H02J 7/02* (2013.01); *H02J 50/001* (2020.01)

(58) Field of Classification Search
None
See application file for complete search history.

(56) References Cited

U.S. PATENT DOCUMENTS

| | | | |
|---|---|---|---|
| 2006/0013349 A1* | 1/2006 | Koh | H03L 7/0812 375/376 |
| 2011/0309686 A1* | 12/2011 | Scherbenski | H02J 50/001 307/104 |
| 2013/0234536 A1* | 9/2013 | Chemishkian | H02J 50/001 307/149 |

FOREIGN PATENT DOCUMENTS

| | | |
|---|---|---|
| EP | 2 985 925 | 2/2016 |
| WO | WO 2007/019104 | 2/2007 |

OTHER PUBLICATIONS

PCT/ISA/210 Search Report issued on PCT/US2017/031058, pp. 3.
PCT/ISA/237 Written Opinion issued on PCT/US2017/031058, pp. 6.

* cited by examiner

*Primary Examiner* — Kristy A Haupt
(74) *Attorney, Agent, or Firm* — The Farrell Law Firm, P.C.; John F. Gallagher, III

(57) ABSTRACT

Provided is a passive charge recovery logic circuit that includes an electromagnetic field capturing device that harvests ambient electromagnetic energy, with the device including a first end and a second end; a first phase shifter including a first end connected to the first end of the device; a second phase shifter including a first end connected to the second end of the device; a peak detector including a first end connected to the first end of the device; and at least four (Continued)

gates that operate by respective first to fourth power clock signals.

20 Claims, 13 Drawing Sheets

RADIO FREQUENCY ENERGY HARVESTING APPARATUS AND METHOD FOR UTILIZING THE SAME

PRIORITY

This application claims priority to provisional patent application No. 62/331,601 filed with the U.S. Patent and Trademark Office on May 4, 2016, the contents of which are incorporated herein by reference.

GOVERNMENT SUPPORT

This invention was made with government support under grant number 1646318 awarded by the National Science Foundation. The government has certain rights in the invention.

BACKGROUND OF THE INVENTION

1. Field of the Invention

The present invention generally relates to an apparatus that harvests ambient alternating current (AC) signals to provide a consistent, efficient electric power supply, and a method of operating the same.

2. Description of the Background Art

Conventional AC computing utilizes a low frequency, i.e., 60-300 Hz, AC power supply [1]. Significant digital computation can be completed with the voltage provided by the AC power supply, with the power supply frequency being several orders of magnitude lower than integrated circuit (IC) operation. Conventional systems maintain the input AC signal at an approximately constant voltage level during a fixed operation time.

For each AC power signal period, a digital core undergoes three different phases, i.e., a first phase of turning-on, a second phase during which computation is performed, and a third phase of turning-off. [2] An accurate reset of a power-on condition is necessary for proper operation and a dynamic memory cell retains logic states between power cycles.

Conventional radio frequency identification (RFID) circuits generally include a resonant antenna circuit electrically connected to an IC. RFID circuits are active or passive. Active RFID circuits use an internal power source, e.g., a battery, to provide operational power. Passive RFID circuits harvest RF electromagnetic energy to power internal circuitry that can include sensors that sense various information, e.g., environmental variables and security breaches, which can be accessed locally or remotely over the Internet or cellular networks. See, e.g., U.S. Pat. No. 7,400,253 to Cohen and U.S. Pat. No. 9,197,984 to Kaufman. The ability of passive RFID circuits to harvest sufficient energy depends, inter alia, on whether each RFID circuit is sufficiently close to electromagnetic field(s) from which power is to be harvested. To overcome this shortcoming, conventional systems increase the number of transceivers that propagate electromagnetic fields, to ensure sufficient power for proper operation of each of a plurality of RFID circuits.

Conventional AC-only RFID circuits utilize operational logic that combine a quasi-static energy recovery logic (QSERL) and a group of transmission gates. [3] Transmission gates switch on and off during both half cycles during AC power supply. Conventional RFID circuits utilize chips approximately 0.002 mm$^2$ in size. However, conventional RFID chips sacrifice low power advantages.

Conventional circuits include a circuit block for a low frequency RFID circuit based on a quasi-static adiabatic logic family, e.g., 2N-2N2P2D logic consisting of a pair of cross-coupled n-channel metal-oxide semiconductor (nMOS) transistors, a pair of complementary NP functional blocks, and two diodes in series with P logic functions. [4] Such adiabatic logic circuits suffer from large energy dissipation by the diodes. Conventional circuits also include a rectifier-free RFID circuit that uses RF-Only logic to reduce area overhead. [5]

In terms of topology, RF-Only logic is fundamentally the same as QSERL. [6] Instead of configuring top and bottom power supply transistors as diodes, the top and bottom power supply transistors are used as a switch controlled by the AC signal over gate and source terminals. The RF-Only logic provides simple, quasi-static logic, but suffers from a lack of robustness caused by output floating associated with a hold phase when in operation. Importantly, only a small part of the electric charge that is stored on the load capacitance circuit is recycled back to power supply, thereby increasing power dissipation, reducing energy efficiency, and reducing circuit area by approximately 80 percent.

The Internet of Things (IoT) provides a computing paradigm to connect enormous network nodes with the devices in the everyday physical realm [7]. IoT has applications ranging from transportation to health care. An enabling factor of IoT is the advancement and integration of identification, sensing, logic computation, and wireless communication techniques. However, conventional IoT devices are constrained by limited device battery life. Photovoltaic, electrostatic, piezoelectric, thermoelectric, RF and inductive transducer energy harvesting methods have been proposed to overcome this shortcoming of conventional systems. However, photovoltaic, electrostatic, piezoelectric, and thermoelectric techniques utilize transducers that depend upon the availability of a corresponding energy resource.

A conventional wireless energy harvester receives ambient electromagnetic waves via an antenna or coupling coil, and converts the alternating power into a direct current (DC) power supply, typically via a full wave rectifier, a voltage multiplier, and a regulator. [8] FIG. 1 illustrates components of a conventional system, including a electromagnetic wave source 110 and a harvesting apparatus 120, which includes a coil or antenna 130, an AC to DC rectifier 140, an electrochemical battery 150, a voltage regulator 160 and a logic block 170 with data in and data out ports.

Converting a harvested AC signal to a DC supply voltage results in significant energy loss due to low power efficiencies of the rectification process, along with large area overhead. Additional power is lost during the regulation step. [9] Even utilizing a state-of-the-art radio frequency down converter (RFDC), at least 30% of the power is lost during timing of this stage. [10] FIG. 2 is a circuit diagram of a conventional RF-DC converter and regulator for conventional IoT devices.

Accordingly, conventional RF wireless power harvesting is not feasible as a primary power supply for conventional IoT devices.

SUMMARY OF THE INVENTION

The present disclosure has been made to address the above-mentioned problems and disadvantages, and to provide at least the advantages described below. Accordingly, an aspect of the present disclosure provides a passive charge recovery logic circuit that includes an electromagnetic field capturing device that harvests ambient electromagnetic energy, with the device including a first end and a second end; a first phase shifter including a first end connected to the first end of the device; a second phase shifter including a first end connected to the second end of the device; a peak detector including a first end connected to the first end of the device; and at least four gates that operate by first to fourth power clock (PCLK) signals, respectively. The first PCLK signal is output at the first end of the device, the second PCLK signal is output at a second end of the first phase shifter, the third PCLK signal is output at the second end of the device, and the fourth PCLK signal is output at the second end of the second phase shifter.

Another aspect of the present disclosure provides a pass-transistor adiabatic logic circuit that includes an electromagnetic field capturing device that harvests ambient electromagnetic energy, with the device including a first end and a second end; a first signal shaper with a first end connected to the first end of the device; a second signal shaper with a first end connected to the second end of the device; and at least two gates that operate by a first PCLK signal and a second PCLK signal, respectively.

A further aspect of the present disclosure provides a complementary energy path adiabatic logic circuit that includes an electromagnetic field capturing device that harvests ambient electromagnetic energy, with the device including a first end and a second end; a first signal shaper with a first end connected to the first end of the device; a second signal shaper with a first end connected to the second end of the device; a peak detector that bulk biases; and two gates, each configured to operate by input of both a first PCLK signal and a second PCLK signal.

BRIEF DESCRIPTION OF THE DRAWINGS

The above and other objects, features and advantages of certain exemplary embodiments of the present disclosure will be more apparent from the following detailed description taken in conjunction with the accompanying drawings, in which.

DETAILED DESCRIPTION OF EMBODIMENTS OF THE PRESENT INVENTION

The present disclosure provides wireless AC computing apparatuses and a method for utilizing the same. A sinusoidal wave AC signal is harvested and directly used for computation by leveraging charge-recycling or adiabatic logic theory. Conventional charge-recycling circuits significantly reduce power dissipation by steering currents across transistors with small voltage differences and by gradually recovering part of the energy stored in parasitic capacitances [11]. Conventional adiabatic logic gates include a load capacitance (C) and on-resistance (R) of transistors in a charging path [12]. In contrast, the present disclosure uses a time-varying voltage source instead of constant power supply to slow a transition time such that $v_c(t)$ is able to instantly follow input signal v(t), so $v_c(t) \approx v(t)$, with the charging current i(t) given by Equation (1):

$$i(t) = C\frac{dv(t)}{dt} = \frac{CV_{DD}}{T}. \tag{1}$$

The energy for a charging event is calculated by integrating the instantaneous power p(t) during the transition time T according to Equation (2):

$$E = \int_0^T (v_R(t) + v_C(t)) \cdot i(t)dt = \frac{RC}{T}CV_{DD}^2. \tag{2}$$

A complete cycle consists of charging and recovering having a similar amount of energy dissipation, with an overall energy dissipation in the adiabatic logic is provided by Equation (3):

$$E_{AL} = 2\frac{RC}{T}CV_{DD}^2. \tag{3}$$

As observed from Equation (3), the slower the circuit operates, the less energy is dissipated, as proposed as an alternative computing method to static CMOS operation [13]. A typical adiabatic system consists of two main parts, with a digital core including charge-recycling gates that generate power clock signals providing both power supply and triggering clock, with an estimated power clock generator conversion efficiency between 10% and 30% [14] [15]. Accordingly, applicability of conventional systems is highly limited due to inefficient generation of the required multiple-phase power clock signals from a DC supply voltage, sacrificing energy savings [16].

Accordingly, a computing circuit is provided that utilizes wirelessly powered efficient charge recovery logic (ECRL). ECRL is a quasi adiabatic logic with nMOS transistors 610, 612 complementary functional blocks (f and $\overrightarrow{f}$) and a pair of cross-coupled pMOS transistors 614, 616.

Figure 1:
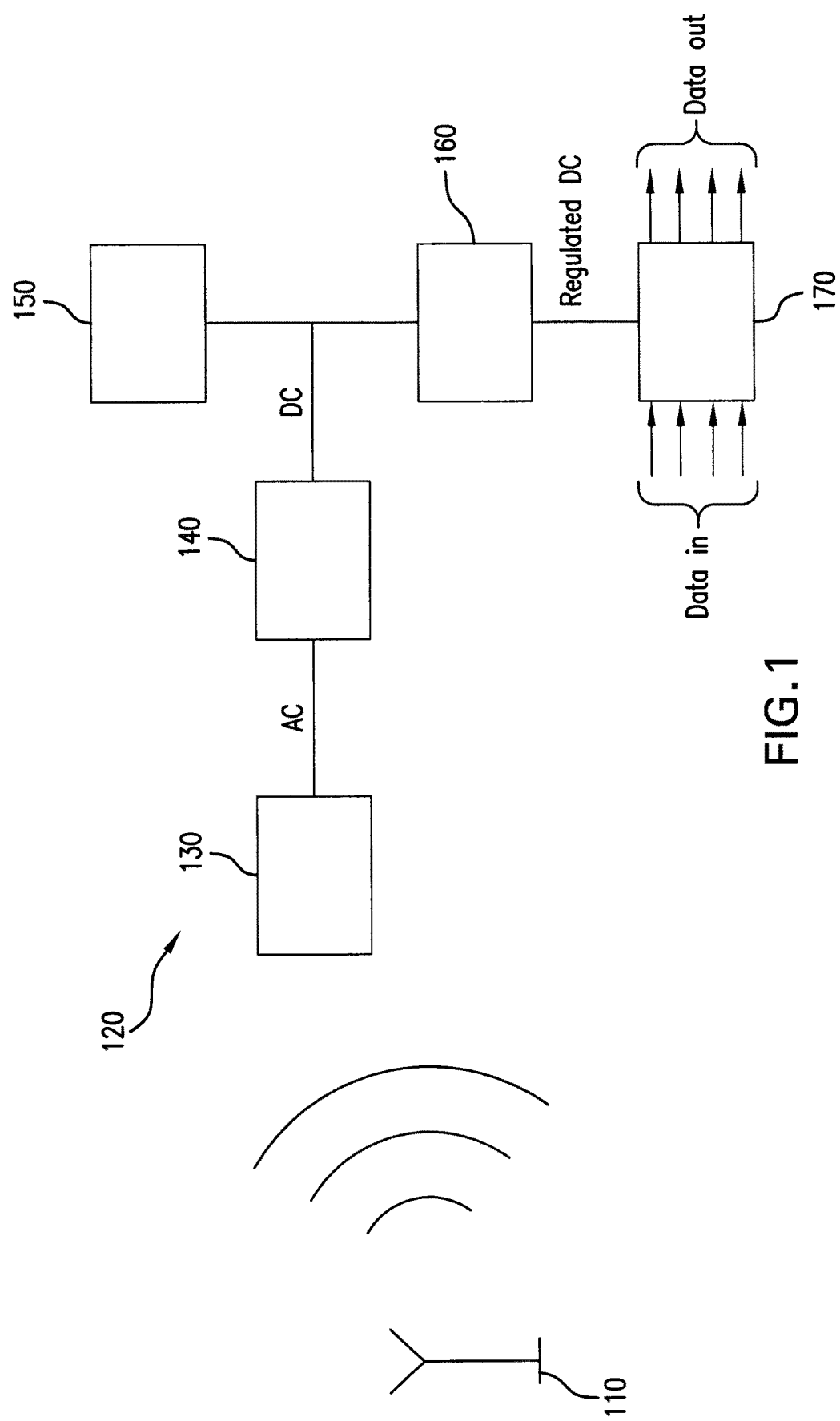
FIG. 1 illustrates components of a conventional system.
Figure 2:
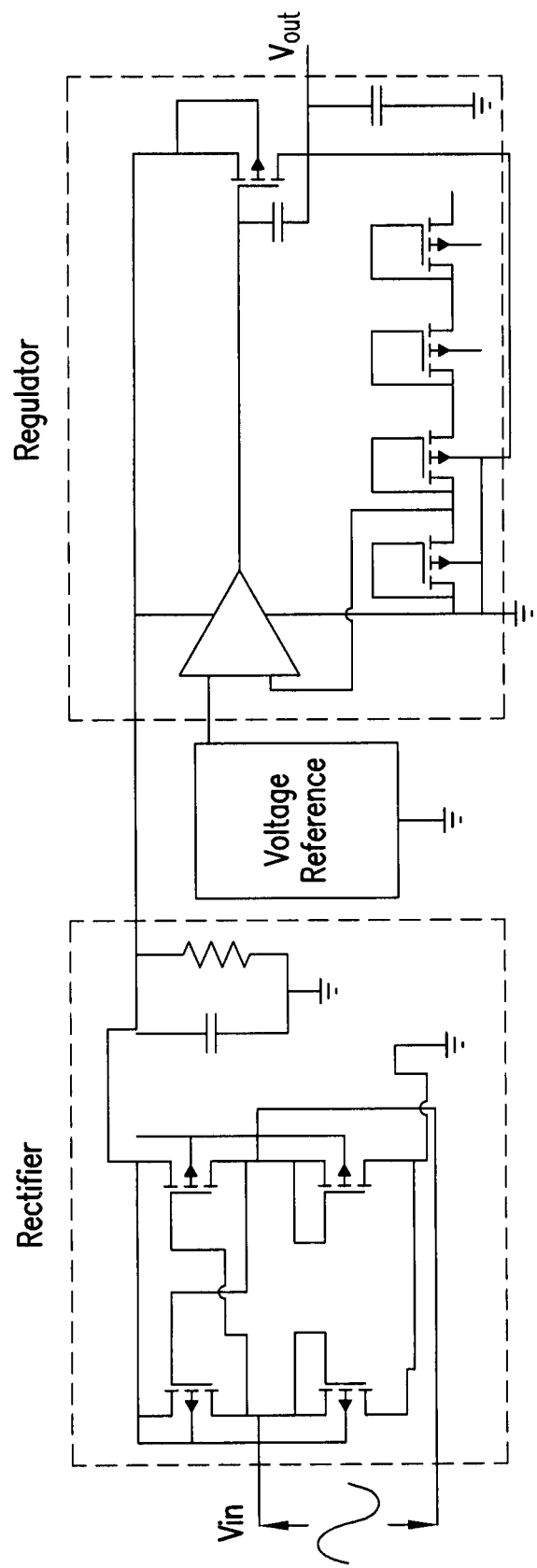
FIG. 2 is a circuit diagram of a conventional RF-DC converter and regulator for conventional IoT devices.
Figure 3:
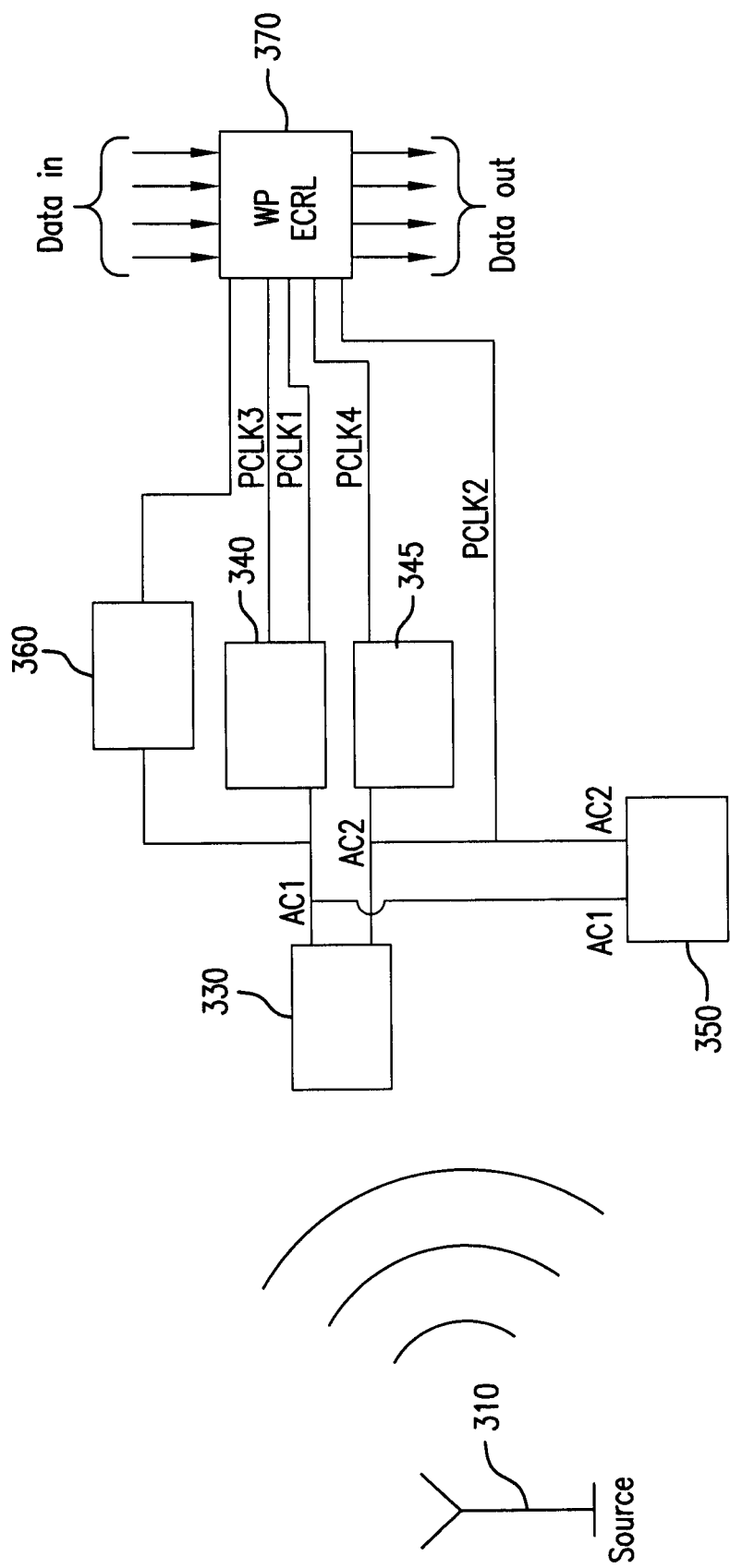
FIG. 3 illustrates a system of a wirelessly powered efficient charge recovery logic (ECRL) circuit according to the present disclosure.

FIG. 3 illustrates a system of a wirelessly powered efficient charge recovery logic (ECRL) circuit according to the present disclosure, in which nMOS complementary functional blocks and cross-coupled pMOS transistors operate with a group of four-phase power clock (PCLK) signals. In FIG. 3, an electromagnetic field capturing device 330, e.g., an inductor or antenna, is provided to harvest energy from source 310. The device 330 outputs the harvested energy to a micro electro mechanical system (MEMS) device 350 that stores the harvested electromagnetic energy in mechanical form. Four PCLK signals are output to the ECRL circuit 370, with the PCLK signals having a ninety degree phase difference. A peak detector 360 is provided that outputs to bulk connections of pMOS transistors of the ECRL circuit 370.

Figure 4A:
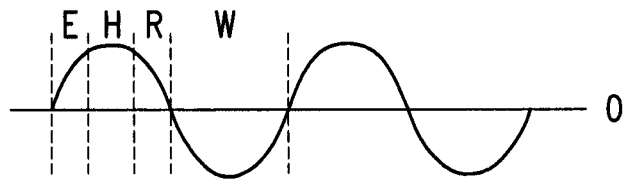
FIG. 4A illustrates a power clock signal in sinusoid waveform according to the present disclosure.
Figure 4B:
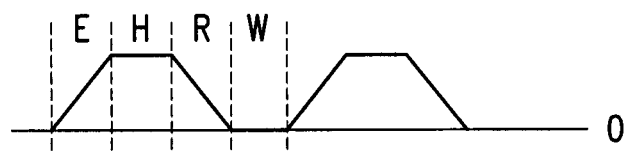
FIG. 4B illustrates a power clock signal in trapezoidal waveform according to the present disclosure.

FIG. 4A illustrates a sinusoid waveform power clock signal. FIG. 4B illustrates a trapezoidal waveform power clock signal. Each PCLK signal is divided into four phases/intervals, i.e., an evaluation phase (E), a hold phase (H), a recovery phase (R), and a wait phase (W), as illustrated in FIGS. 4A and 4B. Initially, the PCLK signal starts ramping up from 0 to Vpp. Once the PCLK signal reaches a threshold voltage, an out bar starts to follow PCLK signal, if the PCLK signal in is at a logic high, thereby outputting a logic low. During the hold phase H, the output node stays above a fixed voltage level so that the next stage can be properly evaluated. Then, during the recovery phase R, the PCLK signal is gradually reduced, thereby recycling the charge stored on the load capacitance. For symmetry, the wait phase W is inserted to complete the four-phase operation, as shown in FIGS. 4A and 4B.

Figure 5:
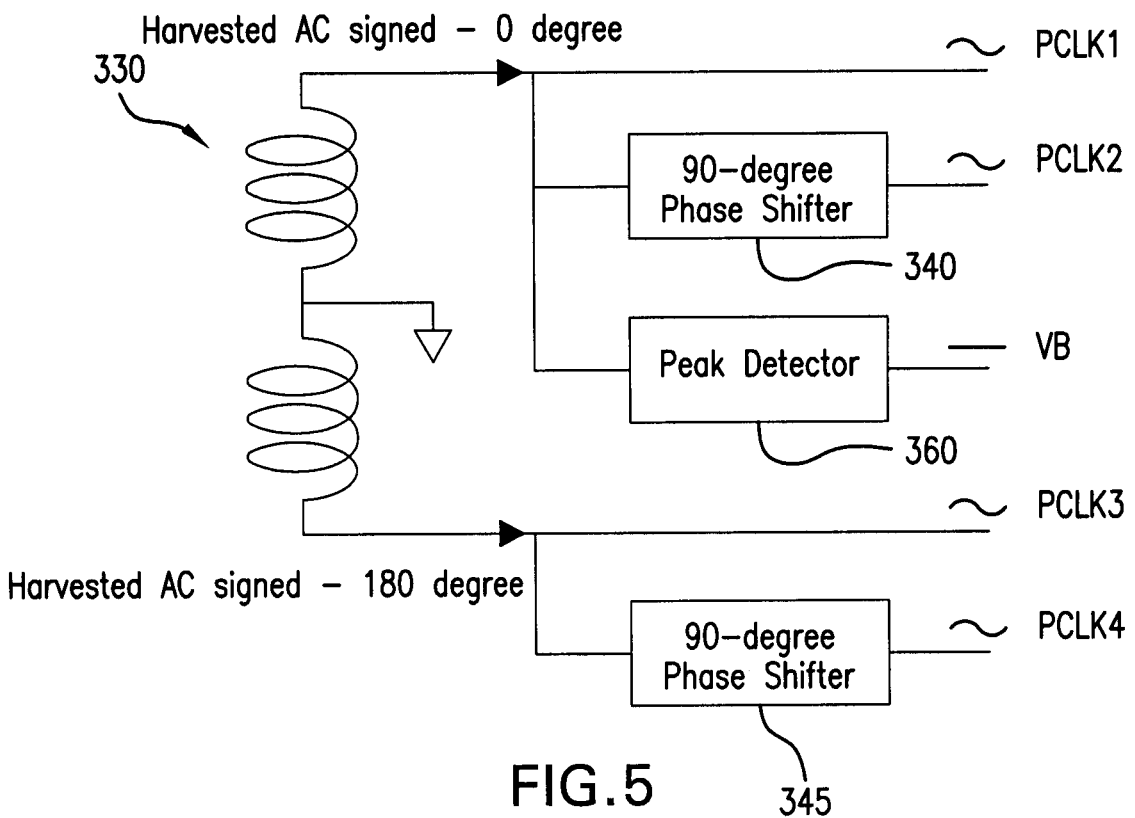
FIG. 5 illustrates an ECRL circuit according to the present disclosure.
Figure 6:
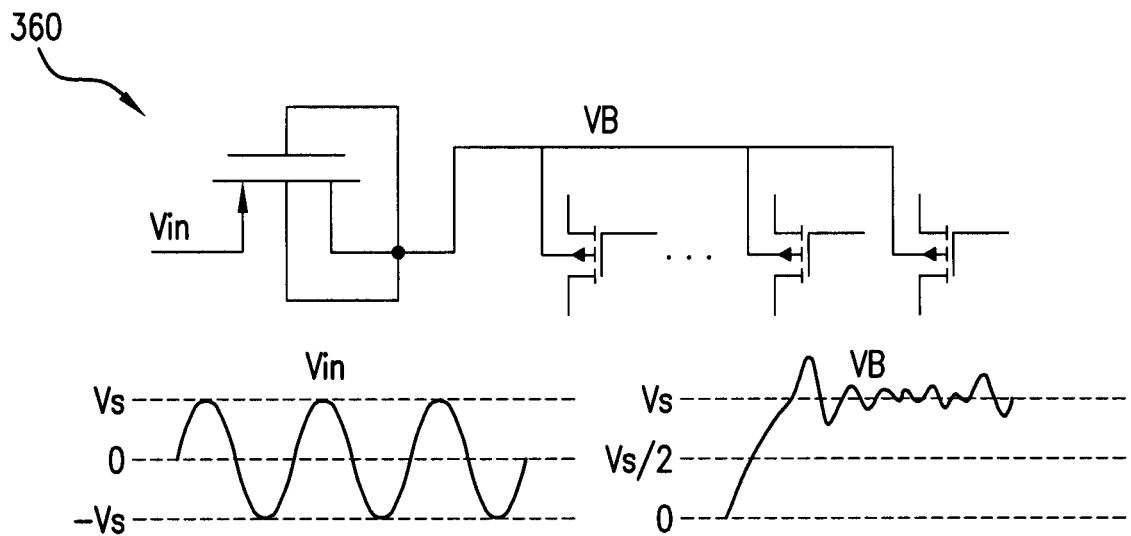
FIG. 6 illustrates a peak detector of the ECRL circuit with graphs of VIN and VB according to the present disclosure.
Figure 7:
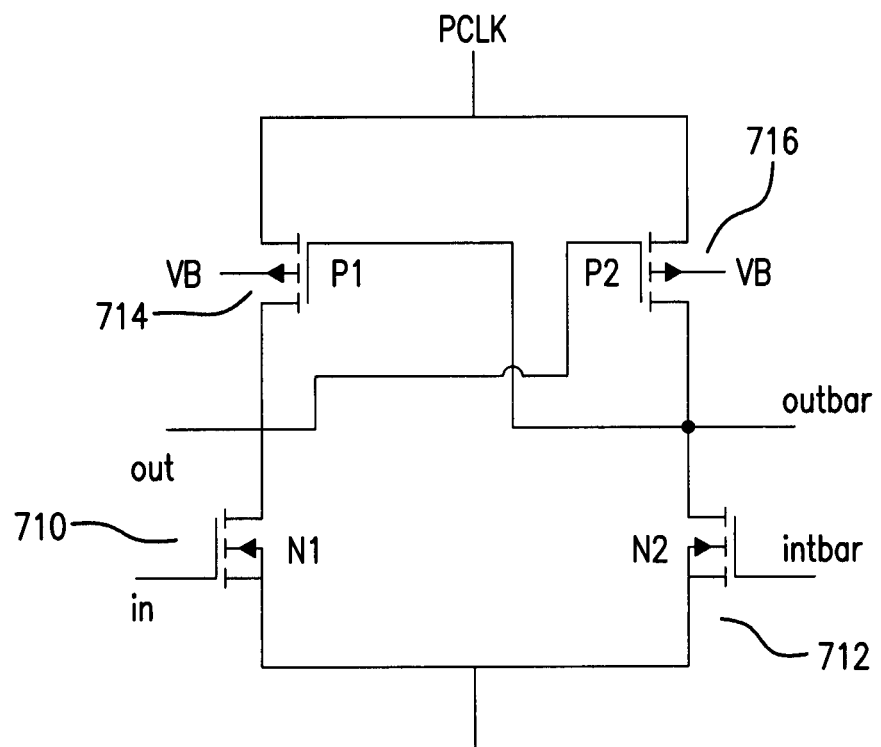
FIG. 7 illustrates cross-coupled p-channel metal-oxide semiconductor (pMOS) transistors of the ECRL circuit according to the present disclosure.
Figure 8:
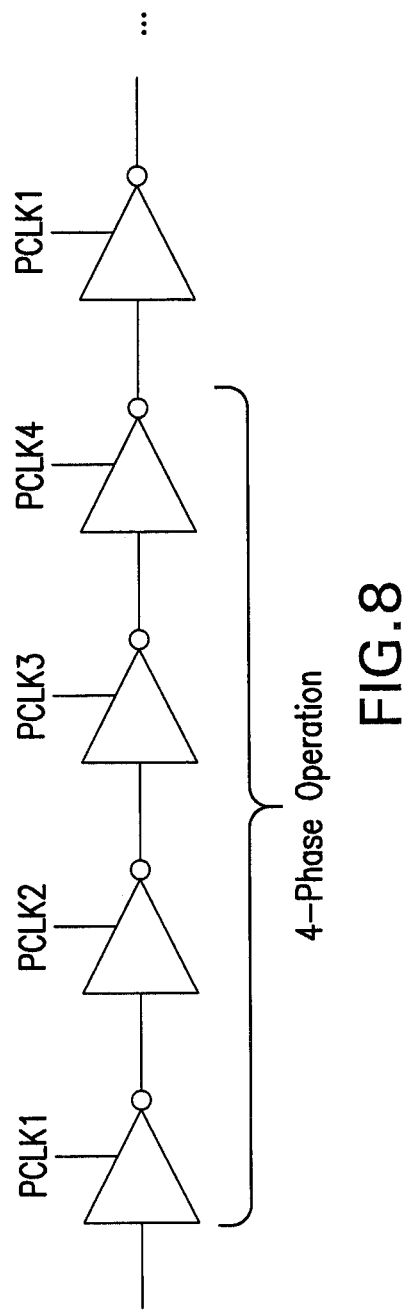
FIG. 8 illustrates gates of the four-phase operation of the ECRL circuit according to the present disclosure.

FIG. 5 is a diagram of a wirelessly powered ECRL circuit. FIG. 6 illustrates the peak detector of the ECRL circuit and provides graphs of $V_{IN}$ and $V_B$. FIG. 7 is a diagram of cross-coupled pMOSs of the ECRL circuit. FIG. 8 illustrates gates of the four-phase operation of the ECRL circuit, with each gate configured as shown in FIG. 7.

In regards to the 90° degree phase difference between power signals of adjacent gates, four power clocks are provided, and phase shifters 340, 345 generate the power clocks, as shown in FIGS. 3 and 5.

The electromagnetic field capturing device 330 includes an inductor and antenna, with the antenna tuned to a predefined frequency. As shown in FIG. 5, the electromagnetic field capturing device can be provided as a plurality of inductors that harvest ambient electromagnetic waves, and output the harvested waves at a 180° phase difference, thereby providing a pair of complementary power clock signals 0° and 180°. A first end of a first inductor is coupled to a second end of inductor, forming a single electromagnetic field capturing device. A second end of the electromagnetic field capturing device outputs PCLK1, and is input to phase shifter 340 to output PCLK2. The second end of the electromagnetic field capturing device is input to peak detector 360 to output $V_B$. A first end of the electromagnetic field capturing device outputs PCLK3 and is input to phase shifter 345 to output PCLK4. Thus, when these two signals propagate through the 90° phase shifter, 90° and 270° power clock signals are generated to provide full operation of ECRL computational block.

Peak detector 360 drives the ECRL circuit with harvested AC power, prevents formation of a forward-biased parasitic diode between bulk and drain of two cross-coupled pMOSs in an ECRL gate when voltage drop $V_B$ exceeds a forward-on threshold. As a result, the peak detector 360 cuts off the forward current of the diodes. As shown in FIG. 6, the peak detector is series connected to a diode having a capacitance, outputting a DC voltage equal to the peak value of the applied AC signal.

Phase shifters 340, 345 generate a fixed phase angle along a transmission line driven by the harvested electromagnetic AC waves of a predetermined frequency. Switched low pass and high pass topologies are commonly used in monolithic microwave ICs for achieving a flat band of 180° phase shift [17]. A low pass arm is extracted from the switched line phase shifter to generate the four-phase power clock signals, and the phase shift circuitry is modeled as an n-LC low pass network. For a six phase shift, the values of inductor (L) and capacitor (C) are determined from Equation (4):

$$L = \frac{Z_0 \sin\theta}{\omega} \text{ and } C = \frac{1-\cos\theta}{\omega Z_0 \sin\theta}, \quad (4)$$

FIGS. 9-15 illustrate a wirelessly powered pass-transistor adiabatic logic (PAL) passive computing power source and operation thereof. In contrast to ECRL, PAL folds the bottom terminals to reconnect with a top power clock signal, thereby providing a fully recovering adiabatic path [18].

Figure 9:
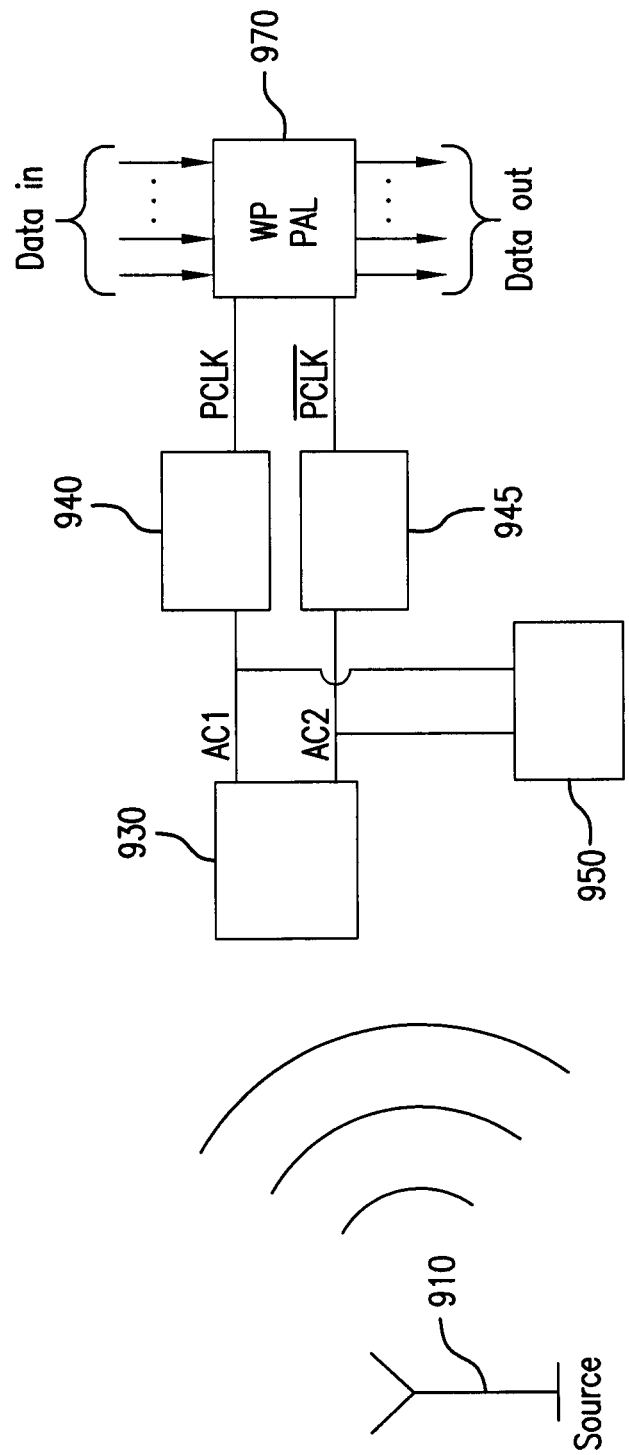
FIG. 9 illustrates a system of a wirelessly powered pass-transistor adiabatic logic (PAL) passive computing circuit according to the present disclosure.

FIG. 9 illustrates a system of a wirelessly powered pass-transistor adiabatic logic (PAL) passive computing circuit including an electromagnetic field capturing device 930 that harvests energy from source 910, and a MEMS device 950 that stores the harvested electromagnetic energy in mechanical form. Two signal shapers 940, 945 receive output from the device 930 and output PCLK signals having a one hundred and eighty degree phase difference to the PAL circuit 970.

Figure 10:
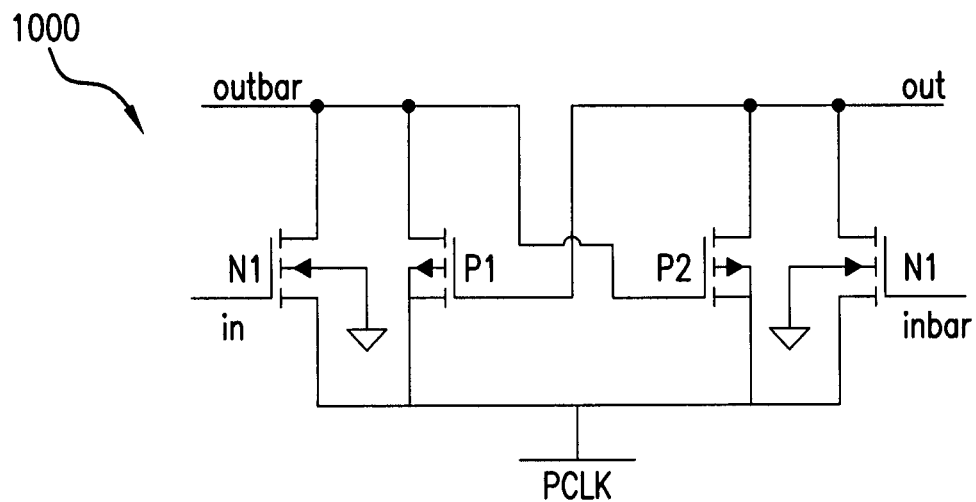
FIG. 10 is a schematic of an inverter of the PAL passive computing circuit according to the present disclosure.

FIG. 10 is a schematic of an inverter of the PAL circuit 970 that includes a gate 1000 with a pair of functional pass-transistors N1, N2 and a pair of charging/recovering transistors P1, P2. Gate 1000 operates by starting at an input signal at logic high and a PCLK rising up from zero. A conducting path is formed through transistor N1 between out bar and PCLK, and the out bar starts to follow the PCLK. Out bar node floats and is maintained close to a logic low level. When the PCLK exceeded a threshold, transistor P1 switches on, for continuously charging out bar, to the peak level. Then, when PCLK diminishes, charge stored on the out bar is recovered.

Figure 11:
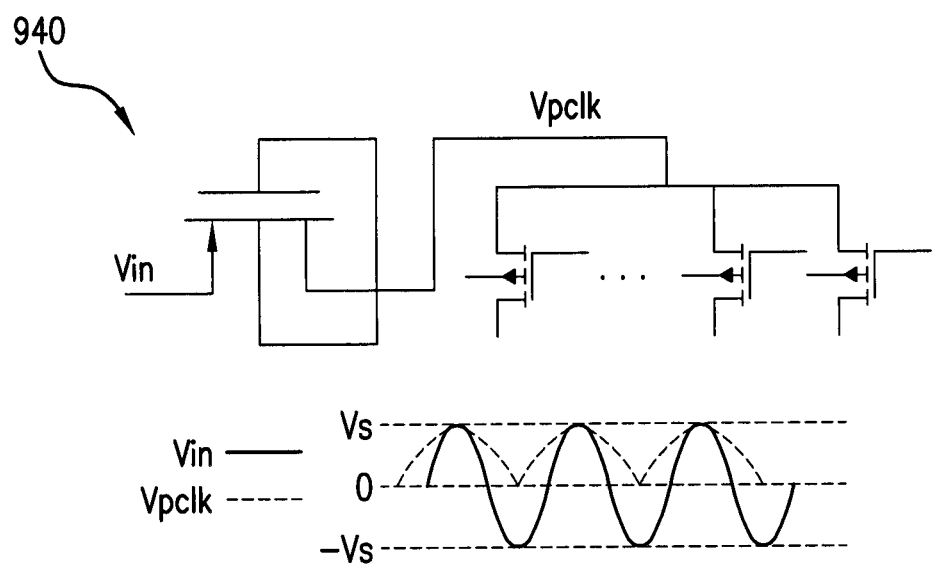
FIG. 11 illustrates a signal shaper of the PAL circuit according to the present disclosure.
Figure 12:
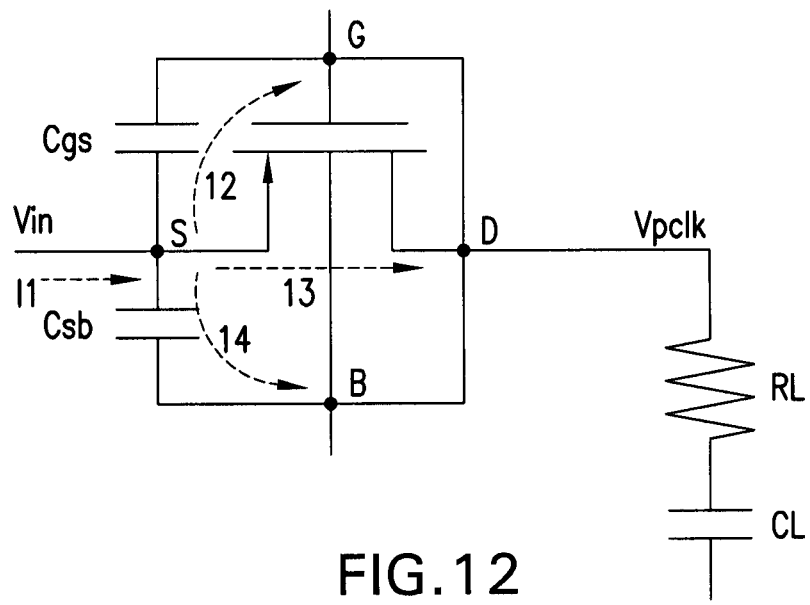
FIG. 12 illustrates simulation waveforms generated for input/output signals of the signal shaper of the PAL circuit according to the present disclosure.
Figure 13:
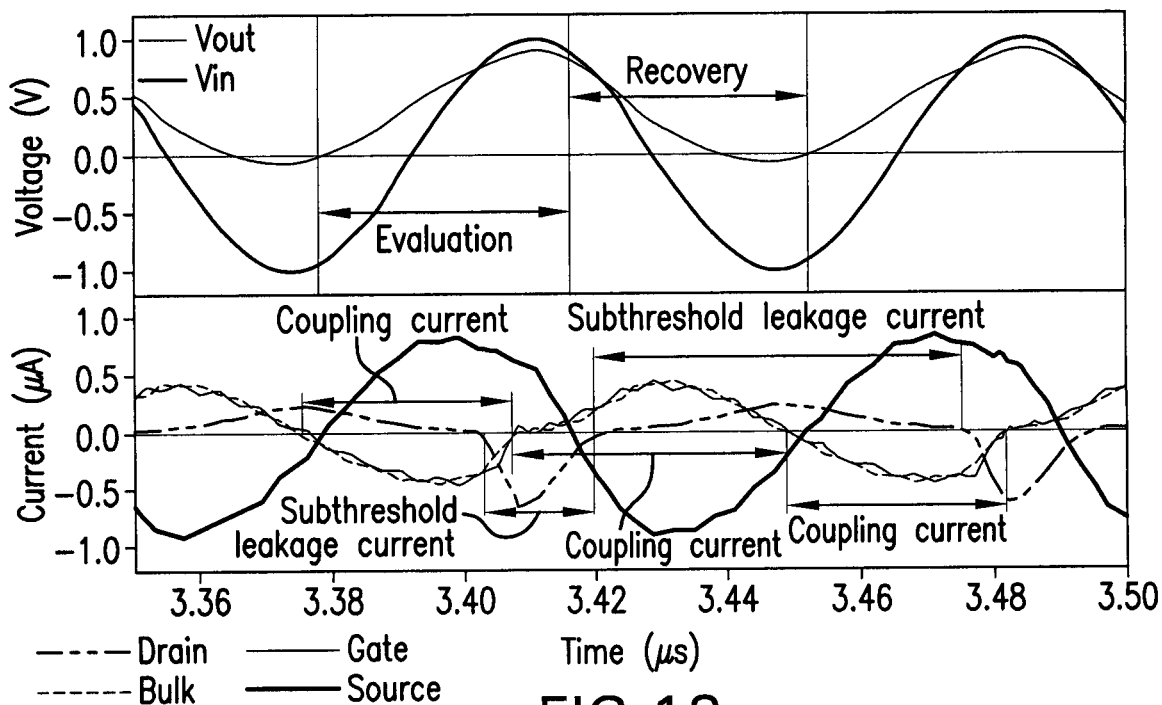
FIG. 13 is a graph of timing waveforms of the signal shaper of the PAL circuit according to the present disclosure.

FIG. 11 illustrates operation of signal shaper, 940, and similarly signal shaper 945. To function during the negative section of the input sinusoidal wave, the signal shaper shifts the voltage level of the AC signal to an above-zero level. The signal shaper is essentially the same as the peak detector of the ECRL system, but uses much larger sized transistors instead of minimum width transistors. As shown in FIG. 11, the signal shaper operates similar to charging a capacitive load through a resistor, with a coupling effect that makes the signal shaper function as a voltage divider, as in Equation (5):

$$V_{pclk}(s) = V_{in}(s) \times \frac{R_L + \frac{1}{sC_L}}{\frac{1}{sC_{GS} + sC_{SB}} + R_L + \frac{1}{sC_L}} \quad (5)$$

$$= V_{in}(s) \times \left(1 - \frac{1}{1 + \left(sR_L + \frac{1}{C_L}\right)(C_{GS} + C_{SB})}\right)$$

The output signal voltage increases as parasitic capacitance grows larger. For a transistor of minimum width, the input voltage is unable to couple through parasitic capacitance, which shows a large impedance. In regards to the signal shaper, simulation waveforms are generated for input/output signals of a signal shaper in serial connection with an equivalent RC circuit model of FIG. 12, in which the labeled currents have a relationship of $I_1=I_2+I_3+I_4$, which corresponds to the waveforms in the bottom half of FIG. 13, respectively. In terms of current mechanism, $I_1$ represents a total current through the signal shaper and $I_2+I_3+I_4$ represents the coupling current through $C_{GS}$, subthreshold leakage current between source and drain, reverse-biased junction leakage current between source and substrate. In the upper part of FIG. 13, transient waveforms are divided into two alternating phases: evaluation and recovery. In the lower part of FIG. 13, source-to-drain current $I_3$ increases with voltage difference between input and output node Two coupling current $I_2$ and $I_3$ follow the similar current profile in both directions. The total current $I_1$ is a weighted summation of all three components. It is observed that coupling currents dominates during most of time, when parasitic capacitance $C_{GS}$ and $C_{SB}$ is sufficient to divide the input voltage signal.

Figure 14:
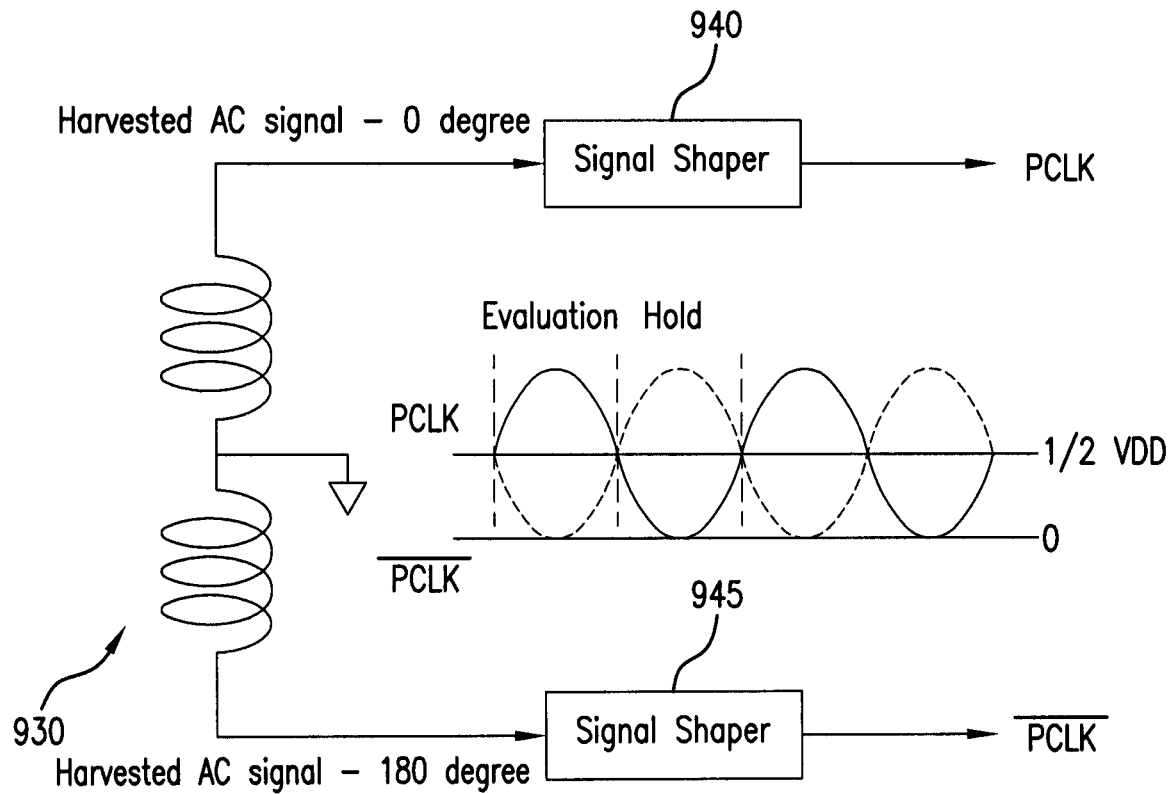
FIG. 14 illustrates two-phase power clocks of the PAL circuit according to the present disclosure.
Figure 15:
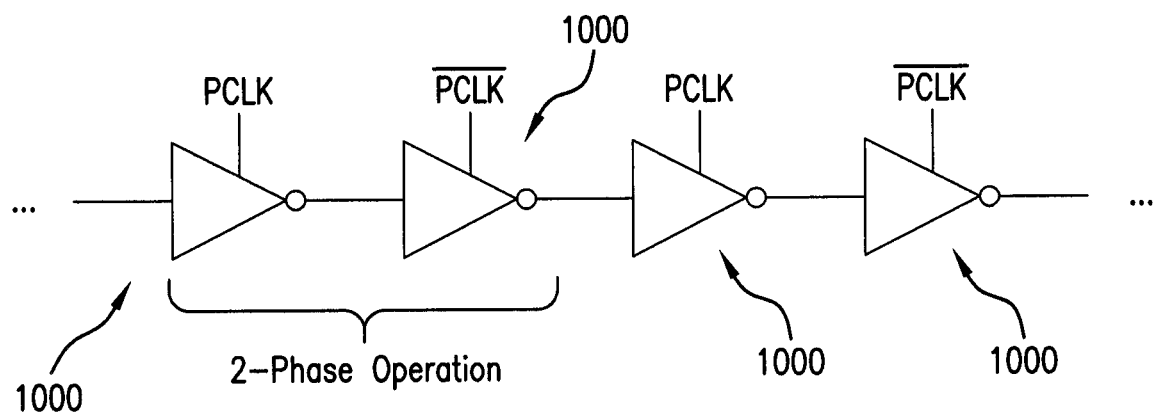
FIG. 15 illustrates a logic chain of the PAL inverter according to the present disclosure.

FIG. 14 illustrates output of two-phase power clocks of the PAL inverter, with a signal shaper 810 and an electromagnetic field capturing device 930. FIG. 15 illustrates a logic chain of the PAL inverter. Before introducing the signal shaper for PAL circuit, applying a negative biasing DC voltage on the substrates of nMOS transistors was proposed to guarantee proper operation. However, large bulk current is induced by leakage mechanisms. The underlying reason for the leakage current is investigated with transient analysis and DC sweep analysis. In this scenario, the leakage current is generated by band-to-band tunneling mechanism in the channel-to-drain and body-to-drain junction. But the electric field of a negative-biased gate has more effect on the former junction than latter one. The presence of gate effect creates a sharper band bending in the channel-to-drain junction, resulting in a much larger tunneling current compared with that of body-to-drain reversed junction. Therefore, it is concluded that the dominant leakage mechanism is induced by gate-induced drain leakage. [19]

Figure 16:
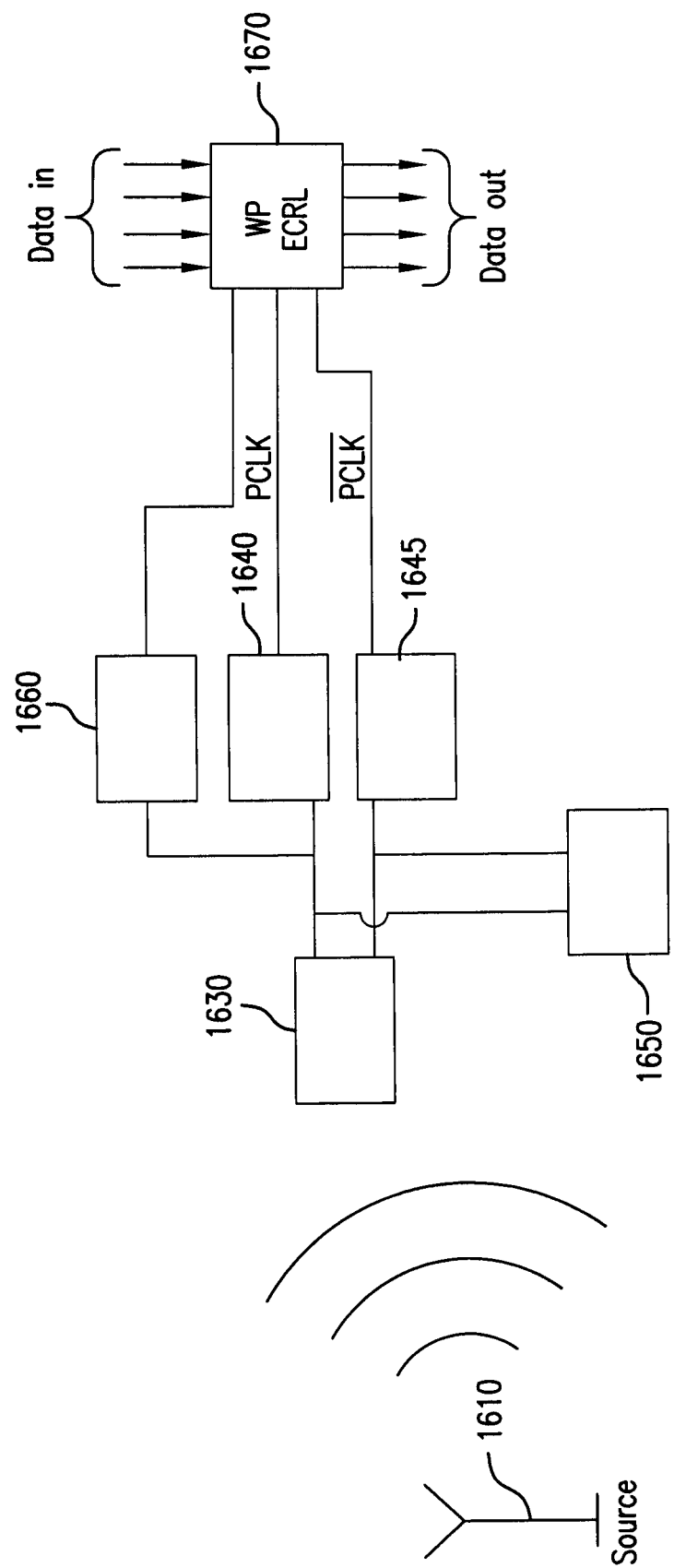
FIG. 16 illustrates a system of a wirelessly powered complementary energy path adiabatic logic (CEPAL) according to the present disclosure.

FIG. 16 illustrates a system of a wirelessly powered complementary energy path adiabatic logic (CEPAL) including an electromagnetic field capturing device 1630 that harvests energy from source 1610, and a MEMS device 1650 that stores the harvested electromagnetic energy in mechanical form. Two signal shapers 1640, 1645 receive output from the device 1630 and output PCLK signals having a one hundred and eighty degree phase difference to the CEPAL circuit. A peak detector 1660 is provided that outputs to bulk connections of pMOS transistors of the ECRL circuit 1670.

Figure 17:
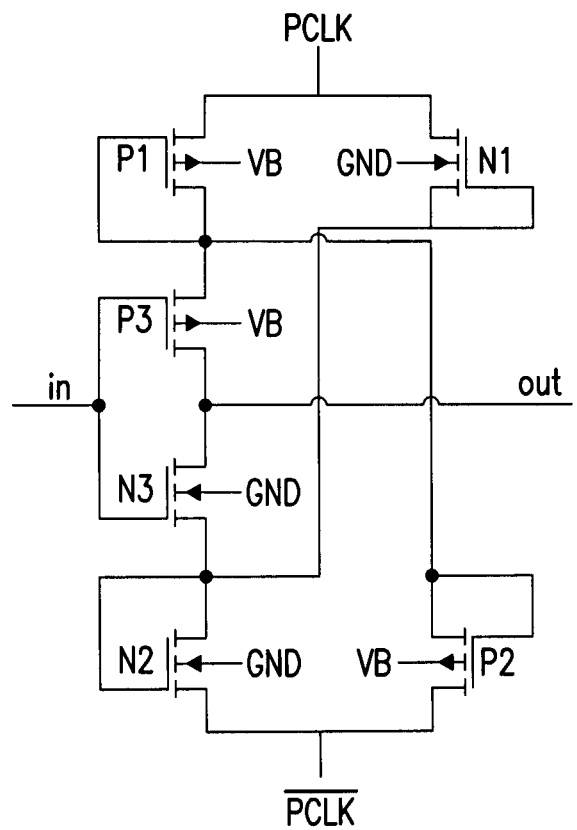
FIG. 17 is a schematic of a signal shaper of the CEPAL according to the present disclosure.
Figure 18:
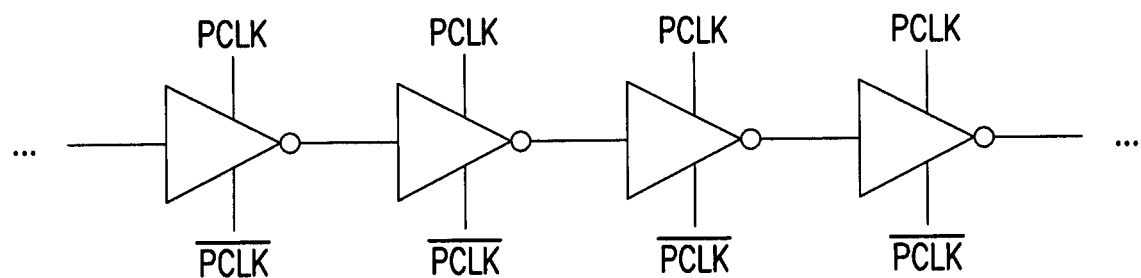
FIG. 18 illustrates a logic chain of the PAL inverter according to the present disclosure.

FIG. 17 is a schematic of a signal shaper of the CEPAL circuit, which is similar to operation of a static logic pull-up and pull-down logic network [20]. In contrast to conventional systems, CEPAL adds a pair of charging transistors (P1 and P2) and a pair of discharging transistors N1, N2, and a high voltage is provided by a peak detector 1660 for bulk biasing. The CEPAL circuit commences operation with node out at a logic-0 voltage level and the inverter having an input signal in of logic-0. When PCLK starts to rise from low to high (and the inverse PCLK is falling from high to low), pull-up transistor P3 switches on, thus making two charging paths through transistors P1 and P2, and the output node will follow either PCLK or the inverse PCLK. Once out reaches at peak voltage level, the PCLK will goes down, leading to a floating output, which is soon eliminated by the rising inverse PCLK power supply. Chains of logic gates are cascaded together like static logic without worrying about signal synchronization, as shown in FIG. 18. After several stages of cascading CEPAL gates, the output signals become degraded and lack robustness. Therefore, D-flip flops are inserted in the CEPAL circuit to restore signal robustness. For proper operation of CEPAL circuits, a signal shaper and a peak detector are provided to provide an appropriate AC supply and bulk biasing voltage, respectively.

Figure 19:
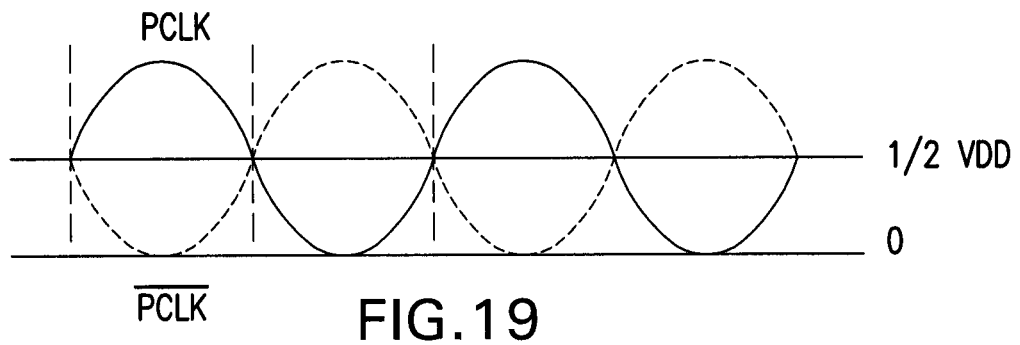
FIG. 19 illustrates waveforms generated by the CEPAL circuit according to the present disclosure.
Figure 20:
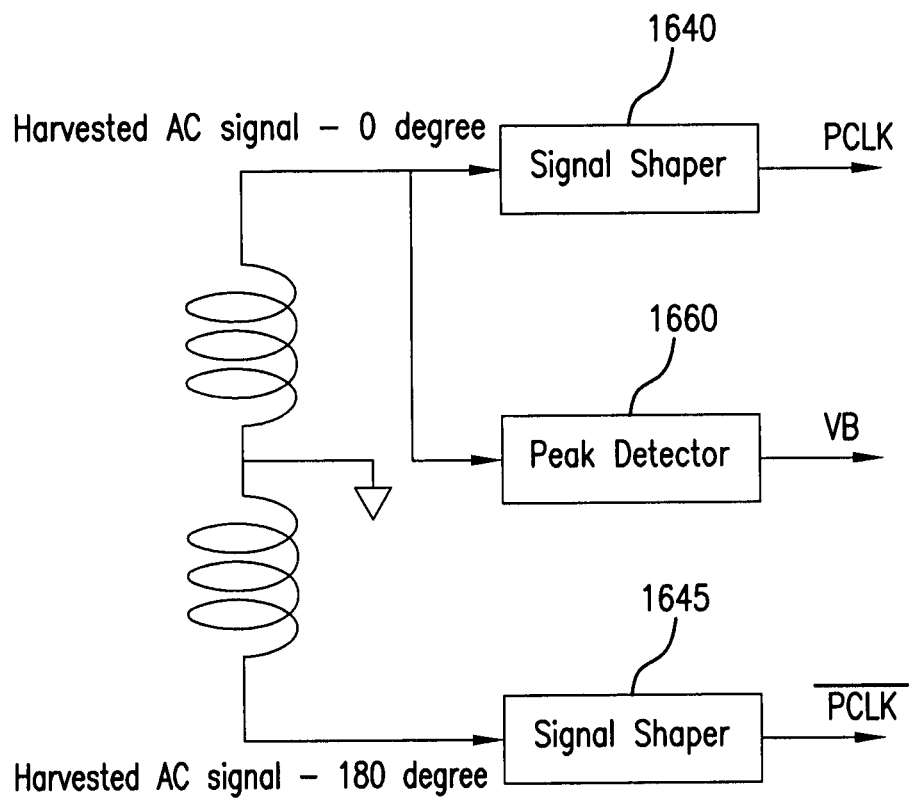
FIG. 20 illustrates two-phase power clocks of the CEPAL circuit according to the present disclosure.

FIG. 19 illustrates waveforms generated by the CEPAL circuit. FIG. 20 illustrates two-phase power clocks of the CEPAL circuit.

Applications of the passive ECRL, PAL and CEPAL circuits include biomedical RFID application circuit, which were investigated at 13.56 MHz, the standard frequency for silicon-based item-level RF identification [21]. In this field, the ALU is an essential part of mobile devices, with streams of data collected by sensing elements being processed in the ALU. Accordingly, wireless-powered 8-bit ALU is implemented in the proposed computing methodology and evaluated by comparing with its counterpart in conventional computing paradigm.

A wireless link is provided. Based on wireless energy harvesting technique used in RFID circuits and certain biomedical implantable devices, the target wireless device is designed to obtain the power supply through inductive coupling [22]. The harvesting of the present disclosure is obtainable from a broader energy spectrum than usable with conventional devices, including the lower power spectrum, e.g., light, radio, and power from home WiFi hotspots, with the present disclosure providing a twenty times power improvement.

Power conversion efficiency of inductive coupling is determined by characteristics like sizing of the coils, the distance, and the electrical properties of the material between the coils, with design parameters specified by the application. For instance, a receiving coil requires a small dimension for implantable devices, compared to IoT applications. Since coil size has a direct effect on power efficiency of wireless link, maximum achievable power efficiency for implantable device would be lower than other applications. High power must be transmitted through external coil to power up implantable device working with DC voltage. However, the passive ECRL, PAL and CEPAL circuits needs only an AC signal. Moreover, the passive ECRL, PAL and CEPAL circuits function at very low ambient power. Accordingly, lower transmitting power and higher distance are achievable for implantable devices, as well as security devices that perform local encryption, utilizing the adiabatic ECRL, PAL and CEPAL circuits of the present disclosure.

Furthermore, implants powered by DC signals are usually an open-loop system requiring data to be transmitted for further processing. Efforts to overcome this issue to provide a closed-loop system have suggested new architectures such as external microprocessor with a hardwire connection to an implant [23] [24]. Conventional circuits require significant amounts of power to process the implant data, and additional power is needed to transmit the data. Exposing patients to such high power can result in high Specific Absorption Rate (SAR). In contrast, the ECRL, PAL and CEPAL adiabatic circuits are low power in nature, and are particularly useful for closed-loop implant systems.

Provided is a computer processor for conducting aspects of the methods of the present disclosure, housed in devices that include desktop computers, scientific instruments, handheld devices, personal digital assistants, phones, a non-transitory computer readable medium, and the like. The method(s) need not be carried out on a single processor. For example, one or more steps may be conducted on a first processor, while other steps are conducted on a second processor. The processors may be located in the same physical space or may be located distantly. In certain aspects of the present disclosure, multiple processors are linked over an electronic communications network, such as the Internet. Aspects of the present disclosure include processors associated with a display device for showing the results of the methods to a user or users, outputting results as a video image that includes feeder outlines or motifs. The processors may be directly or indirectly associated with information databases. As used herein, the terms processor, central processing unit, and CPU are used interchangeably and refer to a device that is able to read a program from a computer memory, e.g., ROM or other computer memory, and perform a set of steps according to the program. The terms computer memory and computer memory device refer to any storage media readable by a computer processor. Examples of computer memory include, but are not limited to, RAM, ROM, computer chips, digital video discs, compact discs, hard disk drives and magnetic tape. Also, computer readable medium refers to any device or system for storing and providing information, e.g., data and instructions, to a computer processor, DVDs, CDs, hard disk drives, magnetic tape and servers for streaming media over networks. As used herein, encode refers to the process of converting one type of information or signal into a different type of information or signal to, for example, facilitate the transmission and/or interpretability of the information or signal. For example, image files can be converted into, i.e., encoded into, electrical or digital information.

While the present disclosure has been shown and described with reference to certain aspects thereof, it will be understood by those skilled in the art that various changes in form and details may be made therein without departing from the spirit and scope of the present invention as defined by the appended claims and equivalents thereof.

REFERENCES

[1] J. Siebert, et al., "Self-timed circuits for energy harvesting ac power supplies," Proceedings of the 2005 Intl. Symposium on Low power electronics and design. ACM (2005) pp. 315-318.

[2] J. Wenck, et al., "Ac power supply circuits for energy harvesting," 2007 IEEE Symposium on VLSI Circuits. IEEE, pp. 92-93.

[3] S. Briole, et al., "Ac-only rfid tags for barcode replacement." Solid-State Circuits Conference. 2004. Digest of Technical Papers. ISSCC. 2004 IEEE International. IEEE, pp. 438-537.

[4] Y. Lie, et al., "Adiabatic circuit applied for If tag." Auto-ID Labs White Paper WPHARDWARE-041 (2007).

[5] W. Zhao, et al., "Design of a rectifier-free uhf gen-2 compatible rfid tag using rf-only logic." RFID, 2016 IEEE International Conference, pp. 1-6.

[6] Y. Ye, et al., "Qserl: Quasi-static energy recovery logic." IEEE Journal of Solid-State Circuits. vol. 36. no. 2, pp. 239-248 (2001).

[7] J. Gubbi, et al., "Internet of things (iot): A vision, architectural elements, and future directions." Future Generation Computer Systems, vol. 29. no. 7, pp. 1645-1660 (2013).

[8] G. K. Balachandran, et al., "A 110 voltage regulator system with dynamic bandwidth boosting for rfid systems." Solid-State Circuits, IEEE Journal of, vol. 41, no. 9. pp. 2019-2028 (2006).

[9] E. Salman, et al., High Performance Integrated Circuit Design. McGraw-Hill. (2012).

[10] T. Soyata, et al., "Rf energy harvesting for embedded systems: A survey of tradeoffs and methodology," IEEE Circuits and Systems Magazine, vol. 16, no. 1, pp. 22-57 (2016).

[11] S. Kim, et al., "Charge-recovery computing on silicon," Computers, IEEE Transactions on, vol. 54. no. 6, pp. 651-659 (2005).

[12] P. Teichmann, Adiabatic logic: future trend and system level perspective. Springer Science & Business Media., vol. 34 (2011).

[13] Y. Moon, et al., "An efficient charge recovery logic circuit." Solid-State Circuits, IEEE Journal, vol. 31, no. 4. pp. 514-522 (1996).

[14] P. Ranjith, et al., "An efficient power clock generation circuit for complementary pass-transistor adiabatic logic carry-save multiplier." Computers and Devices for Communication, 2009. CODEC 2009. 4th International Conference.

[15] A. Blotti, et al., "Ultralow-power adiabatic circuit semi-custom design," IEEE Transactions on Very Large Scale Integration (VLSI) Systems, vol. 12. no. 11, pp. 1248-1253 (2004).

[16] M. Arsalan, et al., "Charge-recovery power clock generators for adiabatic logic circuits." Proceedings of the 18th International Conference on VLSI Design. IEEE (2005) pp. 171-174.

[17] I. J. Bahl. Lumped elements for RF and microwave circuits. Artech house (2003).

[18] V. Oklobdzija, et al., "Pass-transistor adiabatic logic using single power-clock supply," IEEE Transactions on Circuits and Systems II: Analog and Digital Signal Processing, vol. 44. no, 10. pp. 842-846 (1997).

[19] X. Yuan, et al., "Gate-induced-drain-leakage current in 45-nm cmos technology," IEEE Transactions on Device and Materials Reliability, vol. 8, no. 3, pp. 501-508 (2008).

[20] C. S. A. Gong, et al., "Analysis and design of an efficient irreversible energy recovery logic in 0.18-mc-mos," IEEE Transactions on Circuits and Systems I: Regular Papers, vol. 55, no. 9, pp. 2595-2607 (2008).

[21] E. Cantatore, et al., "A 13.56-mhz did system based on organic transponders." IEEE Journal of Solid-State Circuits, vol. 42, no. 1, pp. 84-92 (2007).

[22] S. K. Yoon, et al., "A new circuit structure for near field wireless power transmission," Circuits and Systems (ISCAS), 2012 IEEE International Symposium, pp. 982-985.

[23] H. Zhao, et al., "An implantable optrode with self-diagnostic function in 0.35 cmos for optical neural stimulation.", Biomedical Circuits and Systems Conf. (BioCAS). 2014 IEEE, pp. 244-247.

[24] H. Zhao., et al., "A cmos-based neural implantable optrode for optogenetic stimulation and electrical recording." Biomedical Circuits and Systems Conf. (BioCAS), 2015 IEEE, pp. 1-4.

What is claimed is:

1. A passive charge recovery logic circuit comprising:
an electromagnetic capturing device configured to harvest ambient electromagnetic energy, wherein the device comprises a first end and a second end;
a first phase shifter comprising a first end connected to the first end of the device;
a second phase shifter comprising a first end connected to the second end of the device;
a peak detector comprising a first end connected to the first end of the device; and
at least four gates configured to operate by a respective one of a first to fourth power clock (PCLK) signals,
wherein the first PCLK signal is output at the first end of the device,
wherein the second PCLK signal is output at a second end of the first phase shifter,
wherein the third PCLK signal is output at the second end of the device, and
wherein the fourth PCLK signal is output at the second end of the second phase shifter.

2. The circuit of claim 1, wherein an output of the peak detector is configured to bias each gate of the at least four gates.

3. The circuit of claim 1, wherein the circuit is configured to output power from the harvested ambient electromagnetic waves without rectification or regulation.

4. The circuit of claim 1, wherein each of the first to fourth PCLK signals include an evaluation phase, a hold phase, a recovery phase, and a wait phase.

5. The circuit of claim 4, wherein a stored charge is recycled as the recovery phase PCLK signal is gradually reduced.

6. The circuit of claim 4, wherein, when a PCLK signal of the first to fourth PCLK signals reaches a threshold voltage, an out bar follows the PCLK signal.

7. The circuit of claim 6, further comprising a micro electro mechanical system configured to store the harvested ambient electromagnetic energy.

8. A passive radio frequency identification circuit comprising the circuit of claim 1.

9. An Internet of Things (IoT) device comprising the passive radio frequency identification circuit of claim 8, wherein the circuit powers the IoT device.

10. A pass-transistor adiabatic logic circuit comprising:
an electromagnetic capturing device configured to harvest ambient electromagnetic energy, wherein the device comprises a first end and a second end;
a first signal shaper with a first end connected to the first end of the device;
a second signal shaper with a first end connected to the second end of the device; and
at least two gates configured to operate by a first power clock (PCLK) signal and a second PCLK signal, respectively.

11. The circuit of claim 10, wherein the first PCLK signal is output at a second end of the first signal shaper.

12. The circuit of claim 10, wherein the second PCLK signal is output at a second end of the second signal shaper.

13. The circuit of claim 10, wherein each of the first signal shaper and the second signal shaper are configured to shift a voltage level of an AC signal to an above-zero level.

14. The circuit of claim 10, wherein each gate of the at least two gates comprises a pair of pass-transistors.

15. The circuit of claim 10, wherein each gate of the at least two gates is configured to operate starting at an input signal at a logic high and a respective PCLK signal rising up from zero.

16. A passive radio frequency identification circuit comprising the circuit of claim 10.

17. An Internet of Things device comprising the passive radio frequency identification circuit of claim 16, wherein the circuit powers the IoT device.

18. A complementary energy path adiabatic logic circuit comprising:
an electromagnetic capturing device configured to harvest ambient electromagnetic energy, wherein the device comprises a first end and a second end;
a first signal shaper with a first end connected to the first end of the device;
a second signal shaper with a first end connected to the second end of the device;
a peak detector configured for bulk biasing; and
at least two gates, each configured to operate by input of both a first power clock (PCLK) signal and a second PCLK signal.

19. A passive radio frequency identification circuit comprising the circuit of claim 18.

20. An Internet of Things (IoT) device comprising the passive radio frequency identification circuit of claim 19, wherein the circuit powers the IoT device.

* * * * *